United States Patent [19]

Tanaka et al.

[11] Patent Number: 5,569,740
[45] Date of Patent: Oct. 29, 1996

[54] DEPROTEINIZED NATURAL RUBBER LATEX AND ITS PRODUCTION PROCESS

[75] Inventors: Yasuyuki Tanaka, Tokyo; Kazuhiko Shibata, Osaka; Kenichi Ikeda, Osaka; Yuji Nishida, Osaka; Masaharu Hayashi, Wakayama; Shinichi Nakade, Hyogo; Akihito Kuga; Eiji Kanamaru, both of Tochigi, all of Japan

[73] Assignees: Nitto Denko Corporation, Osaka; Kao Corporation, Tokyo; Sumitomo Rubber Industries, Ltd., Hyogo, all of Japan

[21] Appl. No.: 390,031

[22] Filed: Feb. 17, 1995

[30] Foreign Application Priority Data

Feb. 25, 1994 [JP] Japan .................................. 6-052989

[51] Int. Cl.⁶ .............................. C08F 3/26; C08C 1/04; C08C 2/00; B01D 71/24
[52] U.S. Cl. ...................... 528/502 F; 528/486; 528/487; 528/488; 524/498; 521/41; 526/238.3; 210/650
[58] Field of Search .......................... 521/41; 524/498; 528/486, 487, 488, 502, 931, 932, 934; 526/238.3; 210/650

[56] References Cited

U.S. PATENT DOCUMENTS

| | | | |
|---|---|---|---|
| 2,061,276 | 11/1936 | Ingmanson | 528/931 |
| 2,097,481 | 11/1937 | Wallerstein | 528/932 |
| 2,399,156 | 4/1946 | Stamberger | 528/932 |
| 4,160,726 | 7/1979 | DelPico | 210/23 |

FOREIGN PATENT DOCUMENTS

| | | | |
|---|---|---|---|
| 0584597 | 8/1993 | European Pat. Off. | |
| 0624601 | 5/1994 | European Pat. Off. | |
| 0630907 | 5/1994 | European Pat. Off. | |
| 2098222 | 11/1982 | United Kingdom | C08C 1/14 |

*Primary Examiner*—Paul R. Michl
*Assistant Examiner*—Olga Asinovsky
*Attorney, Agent, or Firm*—Sughrue, Mion, Zinn, Macpeak & Seas

[57] ABSTRACT

There are provided a deproteinized natural rubber latex which comprises a purified product of proteolytically treated natural rubber latex and contains fine particles of natural rubber latex, a deproteinized natural rubber which comprises a dehydrated product of the deproteinized natural rubber latex, and a process for the production of deproteinized natural rubber latex which comprises subjecting a latex solution prepared by (1) adding water and/or a surfactant to a natural rubber latex and then proteolytically treating the resulting latex solution or (2) proteolytically treating a natural rubber latex and then adding water and/or a surfactant to the treated natural rubber latex, to purification using a rotary plate membrane separation apparatus. The deproteinized natural rubber latex contains substantially no protein, is excellent in film-forming property, and provides a raw rubber film having excellent green strength, and the process can produce the deproteinized natural rubber latex in a high yield with high production efficiency.

9 Claims, 1 Drawing Sheet

5,569,740

DEPROTEINIZED NATURAL RUBBER LATEX AND ITS PRODUCTION PROCESS

FIELD OF THE INVENTION

This invention relates to a deproteinized natural rubber latex which contains substantially no protein and has excellent green strength and film-forming property and to a process for the production thereof.

BACKGROUND OF THE INVENTION

Field latex as the raw material of natural rubber contains protein and the like contaminants which vary in their qualities and quantities depending on the terrain, season, climate and the like of the place of production, and these contaminants cause problems such as the onset of an allergic reaction on human by the resulting rubber products and variation in the quality of the products. Because of this, the field latex is deproteinized by its treatment with water and a surfactant or with a proteolytic enzyme.

In the treatment with a proteolytic enzyme, protein molecules on the surface of natural rubber latex and in serum are hydrolyzed by the enzyme. The treatment can remove the protein highly accurately as compared with the simple treatment with water and an surfactant, hence providing a natural rubber latex product which contains substantially no protein.

As an known example of the aforementioned deproteinized natural rubber latex, natural rubber latex is purified by treating it with a proteolytic enzyme, diluting the treated latex with water and/or a surfactant and then subjecting the diluted preparation to centrifugation to separate and remove the protein.

However, the deproteinized natural rubber latex produced in this manner has drawbacks in that the product has a poor film-forming property and the resulting raw rubber film shows a poor green strength, causing generation of cracks and the like. In addition, the production process itself also has a disadvantage from a production efficiency point of view, because recovery yield of the natural rubber latex is poor due to a large number of latex particles inevitably remained in the protein-containing phase at the time of centrifugation and great labor is required to remove aggregated latex particles generated inside the centrifuge.

SUMMARY OF THE INVENTION

In view of the above, it therefore becomes an object of the present invention to provide a deproteinized natural rubber latex which contains substantially no protein and has excellent film-forming property and green strength of its raw rubber film, as well as a process by which the deproteinized natural rubber latex can be produced efficiently with high yield.

Particularly, according to the present invention, there are provided a deproteinized natural rubber latex which comprises a purified product of proteolytically treated natural rubber latex and contains fine particles of natural rubber latex, a deproteinized natural rubber which comprises a dehydrated product of the deproteinized natural rubber latex and a process for the production of deproteinized natural rubber latex which comprises purifying a latex solution prepared by (1) adding water and/or a surfactant to a natural rubber latex and then proteolytically treating the resulting latex solution or (2) proteolytically treating a natural rubber latex and then adding water and/or a surfactant to the treated natural rubber latex using a rotary plate membrane separation apparatus.

Other objects and advantages of the present invention will be made apparent as the description progresses.

Figure 1:
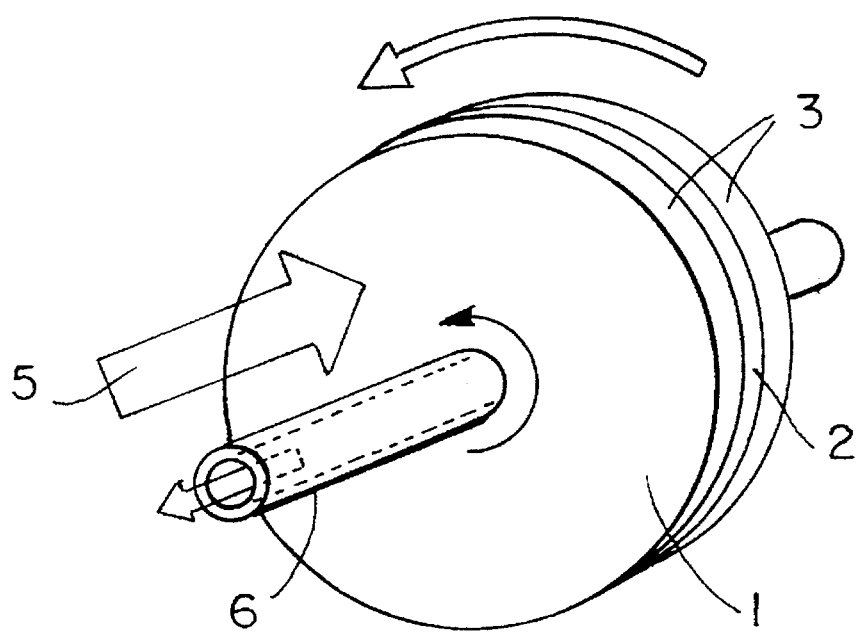
FIG. 1 is a perspective view of a rotary plate membrane separation apparatus.

In these drawings, 1 is a separation membrane, 2 is a support plate, 3 is a spacer, 4 is a passage of permeation liquid, 5 indicates pressurization on the separation membrane 1, and 6 is a hollow rotation axis.

DETAILED DESCRIPTION OF THE INVENTION

In the course of intensive studies conducted with the aim of resolving the aforementioned problems involved in the prior art, the inventors of the present invention have found that a large quantity of enlarged latex particles resulting from their aggregation are contained in the deproteinized natural rubber latex-containing phase to be recovered by centrifugation and a large quantity of fine latex particles are contained in the protein-containing phase to be separated and removed, when the conventional centrifugation method, especially by the use of a continuous centrifuge is carried out. On the basis of the above recognition, the present inventors have further conducted intensive studies and found that aggregation and destruction of latex particles can be prevented even in the case of the continuous treatment method and fine latex particles can be retained and contained in the deproteinized natural rubber latex phase to be separated and recovered, when a purification treatment with a rotary plate membrane separation apparatus is employed, and have succeeded in forming raw rubber films having excellent green strength from the thus obtained latex with high film-forming property and causing no cracks and the like.

In the course of the aforementioned studies, the present inventors have attempted to corroborate an assumption that recovery of a deproteinized natural rubber latex retaining fine latex particles could be attained by a membrane separation method using a spiral, tubular or capillary form pressurized membrane module, but the purification purpose was not able to be attained because of the aggregation of latex particles, especially fine particles, at the time of the compression charging of natural rubber latex with a pump. In the case of the rotary plate membrane separation apparatus of the present invention, it hardly causes aggregation because of the weak action of pressure and the like upon latex particles, its production efficiency is excellent due to its capacity to effect continuous purification and it shows excellent recovery yield of natural rubber latex because of its capacity to recover fine latex particles.

The deproteinized natural rubber latex of the present invention comprises a purified product of proteolytically treated natural rubber latex, which contains fine particles of natural rubber latex.

The deproteinized natural rubber latex having the aforementioned properties can be produced by a process in which subjects a latex solution prepared by (1) adding water and/or a surfactant to a natural rubber latex and then proteolytically treating the resulting latex solution or (2) adding water and/or a surfactant to the natural rubber latex proteolytically treated, to purification using a rotary plate membrane separation apparatus.

As the natural rubber latex proteolytically treated or to be proteolytically treated, a rubber latex collected from natural rubber trees may be used after or before its treatment with a proteolytic enzyme. The rubber latex collected from natural rubber trees is not particularly limited and may be in the form of a fresh field latex or its ammonia-treated commercially available product.

Also, the proteolytic enzyme used or to be used in the proteolytic treatment is not particularly limited and may be selected from those which are produced by bacteria, fungi, yeasts and the like. Preferred examples of the proteolytic enzyme are bacterial proteases, particularly those having low molecular weight (e.g., 50,000 or less) from the viewpoint of separation membrane permeability and the like.

In general, hydrolysis of protein in natural rubber latex with a proteolytic enzyme can be effected by adding a proteolytic enzyme to the rubber latex collected from rubber trees and standing or stirring the resulting latex solution for several minutes to 1 week. The amount of the proteolytic enzyme is generally from 0.001 to 10% by weight, preferably from 0.001 to 5% by weight, based on the latex solution. If the amount of the enzyme is smaller than 0.001% by weight, there is a possibility that protein is not decomposed, and if it is larger than 10% by weight, effect proportional to an increase of the amount is not obtained and, rather, lowering of the enzyme activity is caused.

In the proteolytic treatment, the reaction may be carried out at a controlled temperature of from 5° to 90° C., preferably from 20° to 60° C. If the temperature is lower than 5° C., there is a possibility that the decomposition reaction does not proceed smoothly, and if it is higher than 90° C., there is a possibility that deactivation of the enzyme is quickened.

In the proteolytic treatment, it is desirable from separation efficiency, recovery yield and the like points of view to hydrolyze protein molecules into fragments as small as possible having a molecular weight of generally 50,000 or less, preferably 30,000 or less, more preferably 20,000 or less. Hydrolysis of protein molecules into such small molecular weight fragments renders possible easy preparation of the product which contains substantially no protein.

According to the present invention, purification of a natural rubber latex is carried out by adding water and/or a surfactant to the natural rubber latex, thereby washing natural rubber latex particles, and then carrying out separation treatment using a rotary plate membrane separation apparatus.

In this connection, purification of the natural rubber latex is carried out after its proteolytic treatment, but timing of the addition of water and/or a surfactant is arbitrary. In other words, water and/or a surfactant can be added at any stage, namely before the proteolytic treatment, at the time of the proteolytic treatment, for example simultaneously with the addition of the proteolytic enzyme, or after the proteolytic treatment. When the natural rubber latex to be purified is diluted by the addition of water or the like, the dilution can be conducted in an arbitrary proportion, but is preferably conducted such that the concentration of the natural rubber solid is in the range of from 5 to 70% by weight, more preferably from 8 to 60% by weight, most preferably from 10 to 50% by weight.

The surfactant may be selected arbitrarily but preferably from anionic and/or nonionic agents. Examples thereof include anionic surfactants such as of carboxylic acids, sulfonic acids, sulfuric esters, and phosphoric esters and nonionic surfactants such as polyoxyalkylene ethers, polyoxyalkylene esters, polyalcohol fatty acid esters, sugar fatty acid esters, and alkyl polyglycosides. The surfactant can be added generally in an amount of from 0.001 to 10% by weight, preferably from 0.01 to 10% by weight, based on the resulting latex solution.

Figure 2:
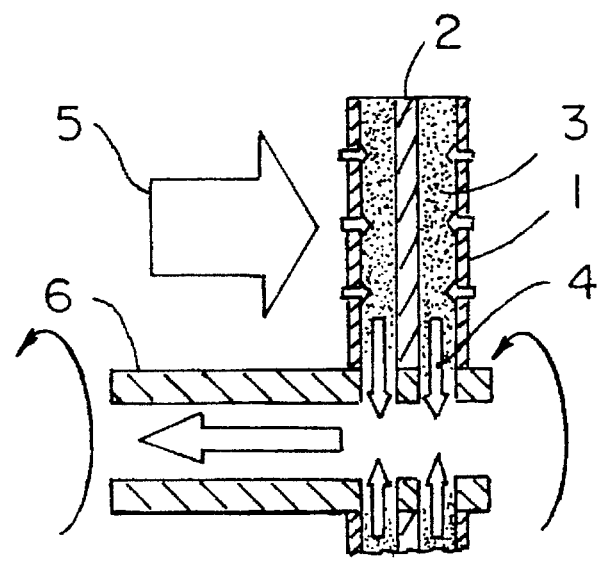
FIG. 2 is a side view of the rotary plate membrane separation apparatus.

Any arbitrary rotary plate membrane separation apparatus can be used for the washing and purification of the proteolytically treated natural rubber latex mixed with a surfactant and the like. Examples of the rotary plate membrane separation apparatus are shown in FIGS. 1 and 2. The apparatus shown in the drawings comprises a plate membrane unit constructed by attaching a separation membrane 1 to both sides of a support plate 2 via a spacer 3 and forming a permeation liquid passage 4 between the support plate 2 and the separation membrane 1, and a hollow rotation axis 6 inside of which is communicated with the plate membrane unit. The arrow 5 indicates pressurization on the separation membrane. In this instance, a general practical apparatus may have a plurality of the plate membrane unit connected along the hollow rotation axis.

By dipping the illustrated apparatus in the natural rubber latex and rotating the support plate 2 via the rotation axis 6, waste liquid containing hydrolyzed protein fragments and the used proteolytic enzyme permeates into the permeation liquid passage 4 via the separation membrane 1 as shown by the arrow and is discharged into the outside of the system through the hollow space in the rotation axis 6. In this manner, the thus purified natural rubber latex remains in the apparatus-dipped vessel and the separation treatment is completed.

According to the rotary plate membrane separation apparatus of the present invention, aggregation of latex particles can be prevented, because the separation treatment is carried out under a large shear force created by the rotation of the separation membrane as described above and the natural rubber latex hardly receive physical forces such as centrifugal force, damages or impacts.

Permeation of waste liquid through the separation membrane can be enhanced for example by employing a system in which pressure in the permeation liquid passage is set at a lower level than the outside of the separation membrane and/or another system in which the outside of the separation membrane is pressurized. A large shear force can also be applied by setting a mild pressure differential of about 0.5 to 1 kgf/cm$^2$ via the separation membrane.

With regard to the separation membrane to be used in the rotary plate membrane separation apparatus, appropriate membranes such as a ultrafiltration membrane and/or a precision filtration membrane may be selected suitably depending on the size of natural rubber latex particles. Material of the separation membrane is not particularly limited, and may be selected preferably from polysulfone, polyether sulfone, polyacrylonitrile, vinyl chloride, and polytetrafluoroethylene. As the material of ultrafiltration membrane, polysulfone is particularly preferred, and as the material of precision filtration membrane, polytetrafluoroethylene is particularly preferred. The radius of the separation membrane is preferably from 10 to 100 cm.

The separation membrane may have such a pore size that hydrolyzed protein fragments can permeate through it but particles of natural rubber latex, preferably fine particles thereof also, cannot. In view of this, the ultrafiltration membrane may have a cut-off molecular weight of from 10,000 to 1,000,000, and the precision filtration membrane may have a pore size of from 0.01 to 3 μm, preferably from 0.01 to 1 μm, more preferably from 0.01 to 0.1 μm.

According to the present invention, the aforementioned separation treatment in which the natural rubber latex is mixed with water and/or a surfactant and then applied to the rotary plate membrane separation apparatus may be repeated a plurality of times depending on the demand, generally 30 times or less, preferably 20 times or less, more preferably 10 times or less, thereby to provide a purified product. The concentration of the rubber solid in the purified product is not particularly limited and may be in the range of generally from 30 to 80% by weight, preferably from 45 to 70% by weight.

It is preferred that the separation treatment is conducted at a temperature of 10° to 50° C. The membrane revolution is preferably from 50 to 1,000 rpm.

Preferred purified product of the present invention, namely the deproteinized natural rubber latex, has a nitrogen content of 0.02% by weight or less. This means that the purified product contains substantially no protein. That is, a natural rubber generally consists of a mixture of a high molecular weight moiety having a molecular weight of 1,000,000 to 2,000,000 and a low molecular weight moiety having a molecular weight of 100,000 to 200,000. It is considered that the high molecular weight moiety is a linked and branched product of the low molecular weight moiety effected via abnormal groups contained in the latter moiety, and the originally biosynthesized product has a molecular weight of about 100,000. In consequence, assuming that one molecule of the low molecular weight natural rubber having a molecular weight of 100,000 would contain one peptide molecule which takes part in the intermolecular bonding, one molecule of such a natural rubber would have a nitrogen content of 0.014% by weight (equivalent to one nitrogen atom) based on the peptide molecule contained therein. Thus, considering nitrogen atoms of peptide molecules which take part in the formation of the high molecular weight moiety, it would be understood that the deproteinized natural rubber latex having the nitrogen content of 0.02% by weight or less means a deproteinized natural rubber latex containing substantially no protein.

In addition, the deproteinized natural rubber latex of the present invention contains fine particles of natural rubber latex generally having a particle size of 1 μm or less, preferably 0.7 μm or less, in an amount of 20% by volume or more, preferably 25% by volume or more, more preferably from 30 to 95% by volume, though the amount varies depending on the initial content of fine particles contained in the natural rubber latex to be purified. In the case of fine particles having a particle size of 0.5 μm or less, they may be contained generally in an amount of 5% by volume or more, preferably 10% by volume or more, more preferably 12% by volume or more. The lower limit of the particle size is generally 0.01 to 0.05 μm.

Based on the initial content (by volume) in the natural rubber latex to be purified, on the other hand, it is desirable to retain fine particles having a particle size of 0.7 μm or less, preferably 0.01 to 0.6 μm, more preferably 0.05 to 0.5 μm, in an amount of 85% or more, preferably 90% or more, more preferably 95% or more. By setting the content of natural rubber latex fine particles to the above range, a raw rubber film having a green strength (at 23° C.) of at least 5 MPa can be obtained. It is preferred that the green strength (at 23° C.) is 6 MPa or more, more preferably 6.5 MPa or more, and most preferably 7 MPa or more, with the preferred upper limit being 15 MPa.

The deproteinized natural rubber latex of the present invention can be used as it is or after adjusting its solid rubber concentration to an appropriate level, and is useful for molding of various rubber articles in the latex state or as a deproteinized natural rubber composed of the dehydrated product of the latex, which may have various shapes such as a sheet, film, bulk, or powder.

The present invention is now illustrated in greater detail by reference to the following examples which, however, are not to be construed as limiting the present invention in any way.

EXAMPLE 1

An HA type natural rubber latex produced in Malaysia (a commercial product having a solid rubber content of 60% by weight) was mixed with pure water to adjust the solid rubber content to 30% by weight. A nonion/anion complex type surfactant and a bacterial protease were added thereto in such an amount that the respective final concentrations were 2% by weight and 0.02% by weight, respectively. The mixture was allowed to stand at 40° C. for 24 hours to obtain a proteolytically treated natural rubber latex. In this instance, particle size distribution of latex particles in the HA type natural rubber latex when measured by a light scattering method was found to be 100% by volume as particles of 0.05 to 3.01 μm, of which 74% by volume was particles of 0.7 to 1.1 μm and 25% by volume was particles of 0.05 to 0.7 μm (of which 10% by volume was particles of 0.05 to 0.5 μm).

Next, pure water was added to the proteolytically treated natural rubber latex to dilute the latex such that its solid rubber content became 15% by weight, and the diluted latex was put into a vessel equipped with a rotary plate membrane separation apparatus, and purified under operation of the apparatus until its solid rubber content became 30% by weight. After repeating the dilution and purification steps further two times, the treated latex was again purified under operation of the same rotary plate membrane separation apparatus to obtain a latex having a solid rubber content of 60% by weight.

In this case, a polysulfone ultrafiltration membrane (200 mm in diameter) having a nominal cut-off molecular weight of 750,000 based on polyethylene oxide as an evaluation substance was used in the above rotary plate membrane separation apparatus.

In the above washing/purification treatment, excellent membrane permeation rates of 22.1 L/m$^2$h with a solid rubber content of 15% by weight and 10.8 L/m$^2$h with a solid rubber content of 40% by weight were obtained under an air pressure of 0.5 kgf/cm$^2$ and at a plate membrane revolution of 300 rpm.

The size distribution of the natural rubber latex particles in the purified product was found to be almost the same as that of the original HA type natural rubber latex (the starting material).

EXAMPLE 2

A purified product was obtained by repeating the process of Example 1 except that a polytetrafluoroethylene precision filtration membrane having a pore size of 0.05 μm as used instead of the polysulfone ultrafiltration membrane in the rotary plate membrane separation apparatus. The size distribution of the natural rubber latex particles in the purified product was found to be almost the same as that of the original HA type natural rubber latex.

Comparative Example 1

When washing/purification treatment similar to that of Example 1 was carried out using a cross flow type non-rotational plate membrane cell having the same ultrafiltration membrane instead of the rotary plate membrane separation apparatus under a diaphragm pump pressure of 0.5 kgf/cm$^2$ and at a flow rate of 2 L/min, aggregation of natural rubber latex occurred in the pump after 60 minutes of the treatment of latex having a solid rubber content of 15% by weight, thus causing termination of the operation.

Comparative Example 2

When the washing/purification treatment of Example 1 was carried out using a dead end type batch cell having the same ultrafiltration membrane instead of the rotary plate membrane separation apparatus under a nitrogen gas pressure of 0.5 kgf/cm$^2$ and at an agitation rate of 500 rpm using a latex stirrer tip in the batch cell, membrane permeation rate was 5.6 L/m$^2$h when the latex having a solid rubber content of 15% by weight was treated, which was about ¼ of the case of the rotary plate membrane separation apparatus, so that preparation of a latex having a solid rubber content of 60% by weight was not carried out.

Comparative Example 3

Using a continuous centrifuge in stead of the rotary plate membrane separation apparatus, a deproteinized natural rubber latex prepared in the same manner as described in Example 1 was mixed with pure water to adjust its solid rubber content to 10% by weight, washed and purified under conditions of 10,000 rpm and 8,200 G until the solid rubber content became 60% by weight, diluted with a 1% by weight surfactant aqueous solution to a solid rubber content of 10% by weight and then subjected to the same centrifugation treatment to obtain a purified product of having a solid rubber content of 60% by weight.

In this case, in order to prevent formation of aggregates, the continuous centrifugation was carried out for 2.5 hours per one operation, i.e., 5 hours in total. Also, 0.5 hour of maintenance time was required to remove aggregates from the centrifuge and restart the operation.

The particle size distribution of the natural rubber latex particles in the purified product was found to be 80% by volume as particles of exceeding 0.7 μm and 20% by volume as those of 0.05 to 0.7 μm (of which 8% by volume was particles of 0.05 to 0.5 μm). On the other hand, particle size distribution of natural rubber latex particles in the waste liquid was found to be 70% by volume as particles of exceeding 0.7 μm and 30% by volume as those of 0.05 to 0.7 μm (of which 18% by volume was particles of 0.05 to 0.5 μm).

Evaluation

The purified products obtained in Examples 1 and 2 and Comparative Example 3 were checked for the following items.

Recovery Yield

Recovery yield was calculated from the weight of solid rubber contents in the purified product.

Nitrogen Content

Nitrogen content in the purified product was examined using a total nitrogen measuring apparatus (Trace Nitrogen Analyzer model PN-10, manufactured by Mitsubishi Kasei Corporation).

Mechanical Stability

M.S.T. (mechanical stability time) was measured in accordance with JIS K 6381, by setting the liquid temperature to 15.0° C., the pH value to 11.1, the solid rubber content to 55% by weight and the emulsifier concentration to 1.0% by weight and using a M.S.T. measuring apparatus manufactured by KLAXON and a B-type viscometer manufactured by TOKIMEC INC.

Green Strength 36 g of each of the purified products was spread on a glass plate (18 cm×12 cm) and dried at room temperature, and the formed film was peeled off from the glass plate and, while keeping its glass-side surface upward, dried for 1 day and then in vacuum. Thereafter, a test piece was punched out from the resulting raw rubber film using a JIS No. 4 dumbbell to measure its green strength (raw rubber strength) by a tensile test at a rate of 500 mm/min.

Film-forming Property

During preparation of the above raw rubber films for green strength test, film-forming characteristics were examined and the results were judged "good" when proper films were formed with no generation of cracks or "bad" when cracks were generated.

The obtained results are shown in Table below.

Table

| Sample No. | Nitrogen Content (wt %) | Recovery Yield (%) | Mechanical Stability (sec:cps) | Green Strength (MPa) | Film Forming Property |
|---|---|---|---|---|---|
| Example 1 | 0.019 | 95 | 900–1150:42.0 | 8.5 | good |
| Example 2 | 0.014 | 95 | 900–1150:42.0 | 8.5 | good |
| Comparative Example 3 | 0.016 | 58 | 90–120:60.0 | 4 or less | bad |

As seen from the results shown in Table, the deproteinized natural rubber latex of the present invention is excellent in its recovery yield, mechanical stability as M.S.T., green strength and film-forming property. While formation of aggregates was observed in Comparative Example 3, continuous operation was able to be carried out in Examples 1 and 2 with no evidence of aggregate formation.

Thus, as has been described in the foregoing, it is apparent that the deproteinized natural rubber latex of the present invention has excellent mechanical stability and that raw rubber films containing fine latex particles and having excellent green strength can be formed from the latex easily with no generation of cracks and the like. Also, according to the production process of the present invention, deproteinized natural rubber latex having such characteristic features can be recovered in a high recovery yield while preventing aggregation of latex particles and retaining fine latex particles, continuous operation can be carried out easily, working safety is excellent because of the low revolution system and the like and maintenance of the apparatus is simple, thus showing excellent production efficiency.

While the invention has been described in detail with reference to specific embodiments, it will be apparent to one skilled in the art that various changes and modifications can be made to the invention without departing from its spirit and scope.

What is claimed is:

1. A deproteinized natural rubber latex which comprises a purified product of proteolytically treated natural rubber latex and contains fine particles of natural rubber latex.

2. The deproteinized natural rubber latex of claim 1, wherein the fine particles of natural rubber latex have a particle size of 1 μm or less and are present in an amount of 20% by volume or more.

3. The deproteinized natural rubber latex of claim 1, wherein a raw rubber film containing fine particles of natural rubber latex which is prepared from the deproteinized natural rubber latex has a green strength of 5 MPa or more.

4. The deproteinized natural rubber latex of claim 1, wherein fine latex particles having a particle size of 0.7 μm or less contained in the natural rubber latex prior to purification remain in a residual ratio of 85% by volume or more after purification.

5. The deproteinized natural rubber latex of claim 1, wherein the nitrogen content of the deproteinized natural rubber latex is 0.02% by weight or less.

6. A deproteinized natural rubber which comprises a dehydrated product of a deproteinized natural rubber latex which comprises a purified product of proteolytically treated natural rubber latex and contains fine particles of natural rubber latex.

7. A process for producing deproteinized natural rubber latex which comprises subjecting a latex solution prepared by (1) adding water and a surfactant to a natural rubber latex or adding water or a surfactant to a natural rubber latex and then proteolytically treating the resulting latex solution or (2) proteolytically treating a natural rubber latex and then adding water and a surfactant to the treated natural rubber latex, or proteolytically treating a natural rubber latex and then adding water or a surfactant to the treated natural rubber latex, to purification using a rotary plate membrane separation apparatus.

8. The process of claim 7, wherein at least one of an ultrafiltration membrane and precision filtration membrane is used as a separation membrane of said rotary plate membrane separation apparatus.

9. The process of claim 7, wherein protein molecules in the natural rubber latex are hydrolyzed with a proteolytic enzyme into fragments having a molecular weight of 50,000 or less, fine latex particles having a particle size of 0.7 μm or less contained in the natural rubber latex prior to its purification are retained in a residual ratio of 85% by volume or more after purification, and the nitrogen content of the latex is 0.02% by weight or less.

* * * * *